July 31, 1956    A. KREIDLER    2,756,903
DEVICE FOR EXTRACTING ARTICLES FROM A CONTAINER
Filed June 3, 1952

INVENTOR
Alfred Kreidler

United States Patent Office 2,756,903
Patented July 31, 1956

2,756,903

DEVICE FOR EXTRACTING ARTICLES FROM A CONTAINER

Alfred Kreidler, Stuttgart, Germany

Application June 3, 1952, Serial No. 291,373

1 Claim. (Cl. 221—215)

This invention concerns a device for extracting articles, such as constructional parts, from a container in which said articles are randomly disposed.

A device is already known with which shoe hooks are extracted from an irregular pile in a container by means of a crank scoop rotating round a fixed pivot. The scoop member of the crank is shaped like a knife, and on passing upwardly through the pile of articles takes a certain number of these astride with it. On reaching a certain incline of the scoop member the articles slide due to their weight along it and arrive on an adjoining rail leading downwards which conducts them to their place of use. According to the law of chance a larger or smaller member of such parts are conveyed which reach in a continuous, but irregular, series the place of work concerned.

For certain assembly purposes it can be necessary that constructional parts, for instance, screws, rings and the like to be conveyed from a container reach the assembly point separately at exactly fixed periods.

It is, therefore, one object of the present invention to provide an extracting device with a crank scoop rotating round a fixed pivot, in which crank scoop terminates in a head suitable at any given moment only for the extraction of a single part. It is advantageous for this head to present a surface such as that of a pin, adapted to the shape of the parts to be conveyed. It is advisable for the crank scoop to be swingable upwards with its head so far over a discharge apparatus (conveyor channel, slide) that the separate parts raised by it can fall over the corresponding supporting ledge on to the discharge apparatus.

It is another object of the present invention to provide an extracting device in which the separate part concerned is conveyed by a scraper to the discharge apparatus. In order to increase the certainty that with each passage of the crank scoop a single part is encountered in the correct position and thus seized, it is advisable in addition to equip the container with a stirring, shaking or combing mechanism. Such a stirring etc. mechanism is used also to prevent "bridge formation" by the parts resting against each other.

With these and other objects in view which will become apparent in the following detailed description, the present invention will be clearly understood in connection with the accompanying drawings, in which.

Figure 1:
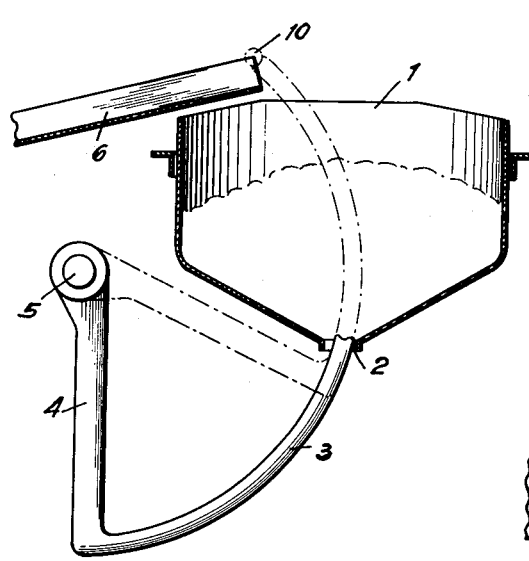
Figure 1 is a section through a container with extracting apparatus for headed screws.
Figure 2:
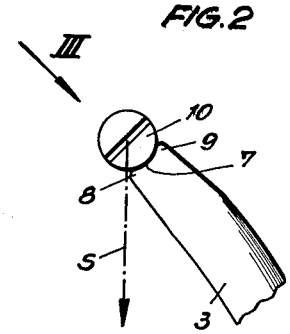
Fig. 2 is a side elevation on an enlarged scale showing the head of the crank scoop at the moment of casting off a screw carried along by it.
Figure 3:
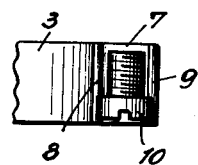
Fig. 3 is a plan view of the head in the direction of the arrow III of Fig. 2.

In the embodiment disclosed in Figs. 1–3 a stationary container 1 contains headed screws in an irregular pile. The base of the container is slotted at 2; a ram 3 is guided through this slot. The ram 3 is situated at the end of a crank arm 4 mechanically movable up and down and extends in the form of an arc round a fixed axis of rotation 5. The ram 3 has a substantially uniform, e. g. rectangular, cross sectional area and fills the slot 2 of the container at least to the extent that none of the screws can fall out of the container 1 into the slot 2. A slide 6 is so disposed that the ram 3 in its uppermost swinging position projects somewhat above the upper edge of the slide 6. The head 7 of the ram 3 is constructed in the form of a trough which is bounded by edges 8, 9.

When the crank scoop 3, 4 moves upwards, the ram 3 is thrust through the screws heaped in the container 1. Even if at first it pushes one or the other to the side, it usually encounters a screw 10 which fills its trough-like head 7 and is therefore taken along with it until the crank scoop 3, 4 occupies the position indicated with chain-dotted lines in Fig. 1. In this position the center of gravity S of the screw 10 passes over the supporting edge and the screw falls down on to the slide, by which it is conveyed to the place of assembly.

Figure 4:
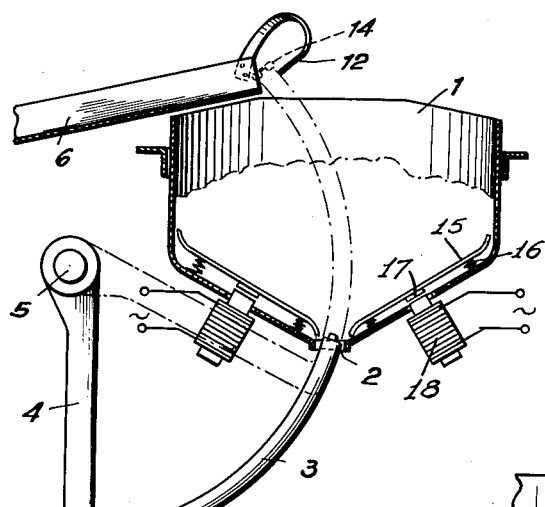
Fig. 4 is a section through a container with an extracting device for rings.
Figure 5:
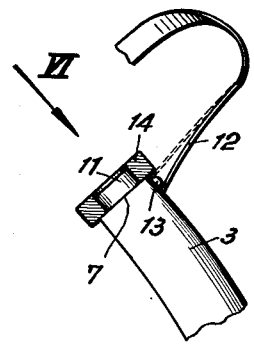
Fig. 5 is a side elevation on an enlarged scale of the head of the crank scoop shortly before scraping off a ring taken along with it.
Figure 6:
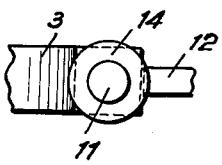
Fig. 6 is a plan view of the head in the direction of the arrow VI of Fig. 5.

The embodiment disclosed in Figs. 4–6 for conveying rings corresponds in its main parts to the above described construction. The ram head 7 is however, provided with a pin 11 for the reception of the separate rings. In order to avoid the necessity for the crank scoop to swing sufficiently high for the ring to fall off by itself, a scraper 12 bent from a spring band is riveted to the slide 6. In addition a small cam 13 is provided on the ram 3 just below the ram head, the cam 13 being situated just within the reach of the scraper 12.

On passing through the rings piled up in the container 1, a ring 14 will almost always be in such a position that it is picked up by the pin 11 and carried upwards. Shortly before reaching the uppermost position of the crank scoop 3, 4, and the ring 14, and immediately afterwards, the cam 13 scrapes through below the scraper 12. When the crank scoop 3, 4, begins its return motion, the scraper 12 is at first carried along by the cam 13 for a short distance and stretched. Then it snaps away from the cam 13, knocks against the front edge of the ring 14 and throws it by its resilience into the slide 6.

In the two examples the ram 3, upon the return of the crank scoop 3, 4 to the starting position, as it—apart from the insignificant cam 13—has no kind of projections, suffers no impediment by the filling of the container 1. In order to avoid a slight "bridge formation" occurring by the parts resting against each other, and to increase the chance that the ram head 7 in each upward movement finds at least one separate part in the right position, the container 1 can be provided with a stirring, shaking or combing mechanism of a conventional type (Fig. 4).

Such stirring or shaking mechanism is by example shown in Fig. 4 and comprises a base 15 resiliently mounted by means of springs 16 on the bottom of the stationary container 1. The under face of the base 15 carries an armature 17 which is disposed opposite an electromagnet 18 which subjects the base 15 to a reciprocating shaking movement upon closing the circuit through the coil of the electromagnet 18, which is connected with a power source feeding alternating or interrupted direct current.

The above described devices ensure that, with a regular upward and downward motion of the crank scoop 3, 4, the separate parts are conveyed at regular intervals to the slide 6 and by the latter to the assembly point at the right operational rate.

While I have disclosed two embodiments of the present invention, it is to be understood that these embodiments are given by example only and not in a limiting sense, the scope of the present invention being determined by the claim.

I claim:

An extraction apparatus for extracting articles such as rings contained in an irregular pile in a container, comprising a cranked scoop mounted for rotation upon a fixed pivot, the said scoop terminating in a head provided with a pin member adapted to receive a ring of a diameter greater than the width of said scoop, and receiving one of the said articles to be extracted, a discharge apparatus disposed above said container for conveying the said article, and a resilient scraper, the free end of the latter being disposed below the said head of the scoop in the upper range of the travel of said scoop, and a cam provided on the outer face of said scoop, the free end of said scraper abutting against said cam upon starting the return movement of said scoop to stress said resilient scraper and the said scraper swinging back resiliently over said cam and then against said article after said cam is passed, thereby throwing the said article raised by the said cranked scoop onto the said discharge apparatus.

References Cited in the file of this patent

UNITED STATES PATENTS

| Number | Name | Date |
|---|---|---|
| 502,895 | Van Norman | Aug. 8, 1893 |
| 884,211 | Rodd | Apr. 7, 1908 |
| 1,036,048 | Wilcox | Aug. 20, 1912 |
| 1,175,386 | Spery | Mar. 14, 1916 |
| 1,462,283 | Hegnes | July 17, 1923 |
| 1,506,294 | Faber | Aug. 26, 1924 |
| 1,536,833 | Fagan | May 5, 1925 |
| 2,322,551 | Stull | June 22, 1943 |
| 2,398,659 | Mead | Apr. 16, 1946 |
| 2,507,186 | Schneider | May 9, 1950 |
| 2,535,050 | Devol | Dec. 26, 1950 |
| 2,578,217 | Anderson | Dec. 11, 1951 |